United States Patent [19]
Ikuta

[11] Patent Number: 5,060,004
[45] Date of Patent: Oct. 22, 1991

[54] DISTANCE MEASURING DEVICE

[75] Inventor: Kiyoshi Ikuta, Tokyo, Japan

[73] Assignee: Canon Kabushiki Kaisha, Tokyo, Japan

[21] Appl. No.: 450,615

[22] Filed: Dec. 14, 1989

[30] Foreign Application Priority Data

Dec. 15, 1988 [JP] Japan ............................... 63-315063
Jan. 19, 1989 [JP] Japan ................................. 1-10778

[51] Int. Cl.$^5$ .......................................... G03B 13/36
[52] U.S. Cl. .................................................. 354/403
[58] Field of Search ....................................... 354/403

[56] References Cited

U.S. PATENT DOCUMENTS

| | | | |
|---|---|---|---|
| 4,582,424 | 4/1986 | Kawabata | 354/403 |
| 4,688,919 | 8/1987 | Ogawa et al. | 354/403 |
| 4,720,723 | 1/1988 | Haronari et al. | 354/403 |
| 4,733,062 | 3/1988 | Horikawa | 354/403 |
| 4,740,806 | 4/1988 | Takehana | 354/403 |
| 4,827,302 | 5/1989 | Takahashi | 354/403 |
| 4,878,080 | 10/1989 | Takehana et al. | 354/403 |

Primary Examiner—Russell E. Adams, Jr
Attorney, Agent, or Firm—Robin, Blecker, Daley & Driscoll

[57] ABSTRACT

In a distance measuring device for measuring a distance to an object by projecting a signal light and by receiving the reflected light thereof, at least two light emitting elements are arranged for projecting the signal light; a common drive source is provided for driving the two light emitting elements; and a control circuit is arranged to prevent the two light emitting elements form simultaneously lighting up.

20 Claims, 10 Drawing Sheets

DISTANCE MEASURING DEVICE

BACKGROUND OF THE INVENTION

1. Field of the Invention:

This invention relates to a distance measuring device and more particularly to an active type automatic distance measuring device having light projecting means.

Figure 13:
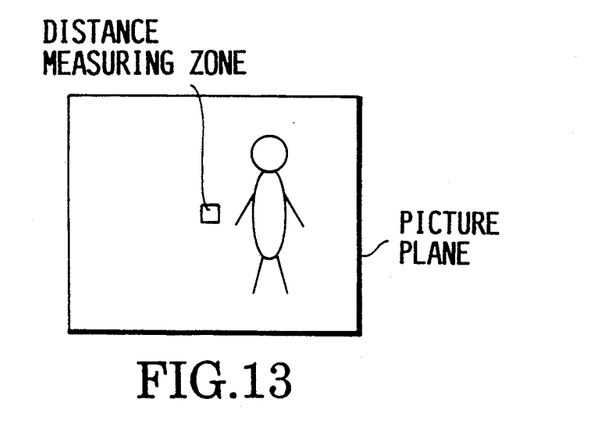
FIGS. 13 to 15 show the conventional distance measuring method.
Figure 14:
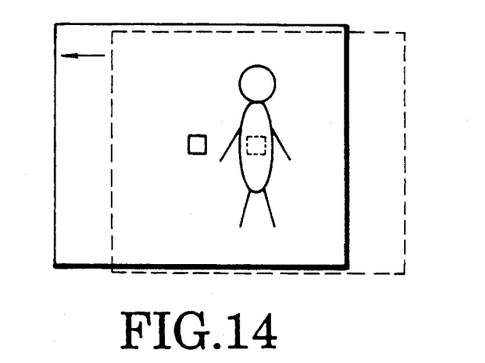

2. Description of the Related Art:

The conventional automatic distance measuring device of a camera has been arranged to have a focus in the central part of a photographing picture plane, as shown in FIG. 13 of the accompanying drawings Therefore, in cases where a main object to be photographed is not in the central part of the picture plane, a distance measuring zone is first adjusted to the main object and, after that, the camera is adjusted to a desired picture (composition) before releasing a shutter as shown in FIG. 14. This action which is called pre-focusing has been necessary.

With the main object not located in the central part of the picture plane, if the shutter is released without pre-focusing, the main object would be out of focus to give a so-called "center-passing" picture as the focus is obtained only in the central part of the picture.

Figure 15:
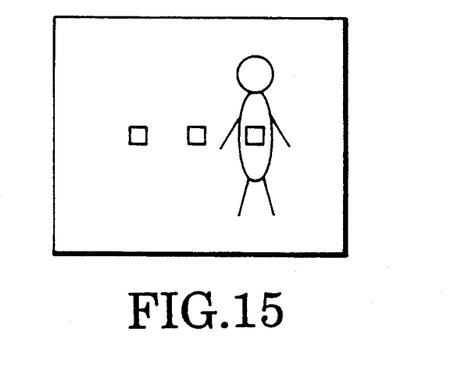

To solve this problem, there has been proposed an automatic distance measuring device which is arranged to measure distances not only for the central part but also for other parts of the picture and to perform a focusing action according to the distance data thus obtained. This is called a multi-point distance measuring action or a wide-field distance measuring action (see FIG. 15). For the multi-point distance measuring action of a so-called active type distance measuring device which has light projecting means and is arranged to project a high-frequency-modulated light onto an object and to measure a distance to the object through light reflected by the object, it is a conceivable method to provide the device with a plurality of light projecting means (or elements).

In this instance, however, if these light projecting means are arranged to serially light up one after another for measuring distances for corresponding distance measuring points, a long period of time is required for the distance measuring action. For a photographing operation, such arrangement causes a so-called time lag to become excessively long.

To solve this problem, it is also conceivable to arrange these light projecting means to be simultaneously lighted up to obtain measured distance information for the different distance measuring points. However, that arrangement presents the following problem:

The camera is operated by a battery disposed within the camera. The battery supplies energy for driving the light projecting means. The amount of the driving energy, therefore, increases with the number of light projecting means employed. A large number of light projecting means might cause the battery to become unable to supply the driving energy in a sufficient amount. In order to supply the sufficient amount of energy for simultaneously driving a large number of light projecting means, the camera must be provided with either an expensive or large battery unsuitable for the camera.

Figure 16:
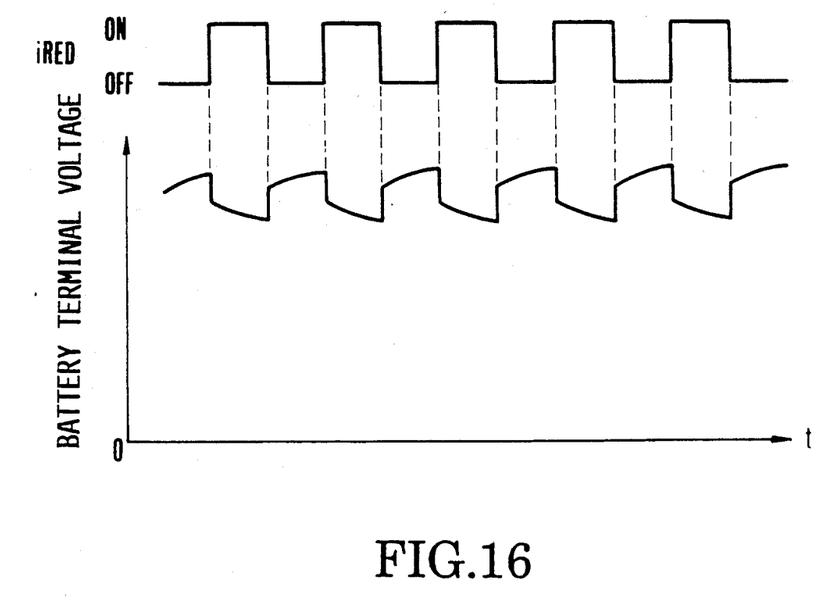
FIG. 16 shows the lighting-up timing of an iRED and terminal voltage variations of a battery.

Further, in cases where the light projecting means are driven through a modulation process, the energy from the battery is intermittently supplied to the light projecting means. If infrared-ray emitting diodes (hereinafter referred to as iREDs) are employed as the light projecting means, for example, an iRED driving current intermittently flows. Therefore, a current supplied from the battery also intermittently flows. The terminal voltage of the battery, i.e., the power supply voltage, is caused to drop by the internal resistance of the battery when the current flows and comes back to the original voltage when no current flows. The power supply voltage thus varies in synchronism with the modulation phase of the iRED as shown in FIG. 16.

Meanwhile, a light receiving circuit which receives the reflection light coming from the object is arranged to detect a signal component by performing so-called synchronous detection or synchronous integration in synchronism with the modulated phase of the iRED, that is, in synchronism with the phase of the signal component.

Therefore, if the variation of the power supply voltage of the light receiving circuit causes the varying degree thereof which is synchronous with the iRED modulation phase, i.e., the phase of the signal component, to come to the signal system of the light receiving circuit, it results in an error in detecting the signal component. In other words, it causes a measured distance data error.

Generally, to minimize this error, the power supply part is provided with a capacitor of a large capacity; or a filter is used for suppressing the power supply voltage variation of the light receiving circuit; or the light receiving circuit is arranged in such a way as to prevent as much as possible the signal system from being affected by the power supply voltage variation.

However, in cases where a plurality of light projecting means are used to increase the required amount of driving current, the terminal voltage variation of the battery increases to cause the degree of the abovestated error to become no longer negligible.

SUMMARY OF THE INVENTION

This invention is directed to the solution of the above-stated problems of the prior art. It is therefore a principal object of this invention to provide a distance measuring device which is of the kind measuring a distance to a photographed object by projecting a signal light on the object and by receiving a reflected light and is capable of lessening a distance measurement error and reducing the length of distance measuring time by preventing the distance measurement from being affected by variations in power supply due to the process of lighting up light emitting means. To attain this object, the distance measuring device according to this invention comprises at least two light emitting means; a common drive source for driving the two light emitting means; and control means arranged to prevent the two light emitting means from simultaneously lighting up.

The above and other objects and features of the invention will become apparent from the following detailed description of embodiments thereof taken in conjunction with the accompanying drawings.

DETAILED DESCRIPTION OF THE PREFERRED EMBODIMENTS

Figure 1:
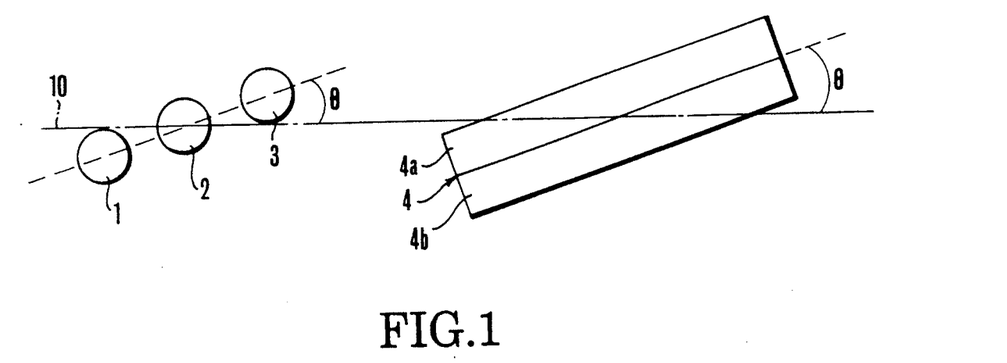
FIG. 1 is a front view showing the light projecting and receiving optical systems of a distance measuring device which embodies this invention.

The details of this invention are described in the following through the embodiments thereof with reference to the accompanying drawings:

FIG. 1 shows a first embodiment of the invention. Infrared ray emitting diodes 1, 2 and 3 (hereinafter referred to as iREDs) are arranged in a row slanting at an angle $\theta$ to a base line 10. A sensor 4 is split into two light receiving areas 4a and 4b. The boundary line between the light receiving areas 4a and 4b slants also at the angle $\theta$ to the base line 10.

Figure 2:
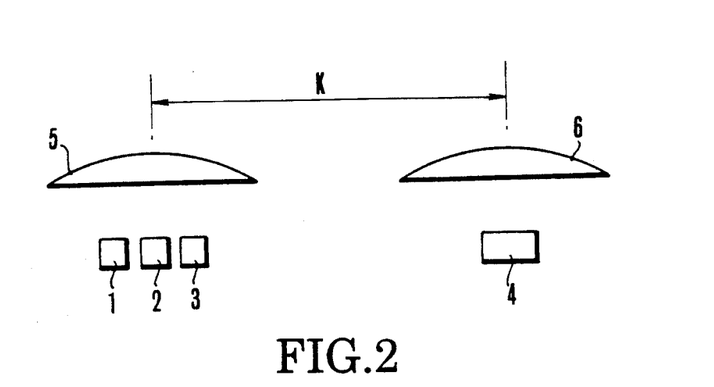
FIG. 2 is a top view showing the same optical systems as viewed from above.

FIG. 2 shows the arrangement of FIG. 1 as viewed from above. The same parts as those of FIG. 1 are indicated by the same reference numerals. A light projecting lens 5 is arranged to condense light emitted from each of the iREDs 1, 2 and 3 into a beam which is directed to an object to be photographed. A light receiving lens 6 is arranged to condense a reflection light coming from the object and forms it in a spot-light image on the light receiving sensor 4. The light projecting and receiving lenses 5 and 6 are spaced at a base line length K.

Figure 3:
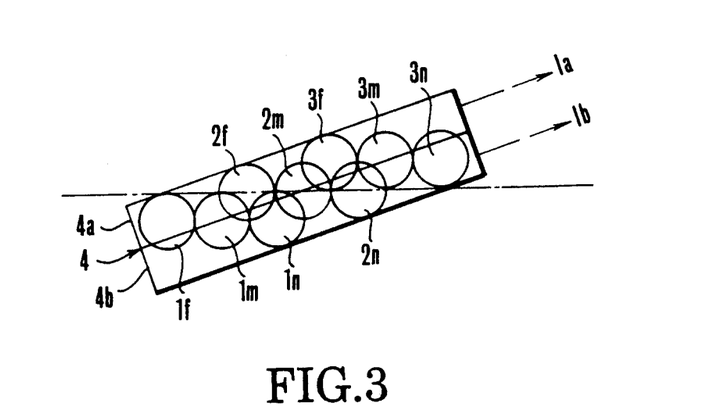
FIG. 3 is a front view showing light receiving spots obtained on a light receiving sensor of FIG. 1 according to object's distances.

With the distance measuring device arranged in this manner, the light receiving spot positions corresponding to the iREDs are as shown in FIG. 3. The light emitted from the iRED 1 is reflected by the object and is imaged as a spot light on the light receiving sensor 4. This spot position varies with the object's distance in the direction of the base line length. Assuming that the light receiving spot is "1f" when the object is located at a distance farthest within a distance measuring range and is "1n" when the object is located at a nearest distance within the range, the light receiving spot shifts in the direction of the base line length between the positions "1f" and "1n" when the object's distance varies within the distance measuring range. A light receiving spot "1m" indicates that the object is located at an intermediate distance in terms of the depth of the distance measuring range. The received spots of light emitted from the iRED 2 likewise become as represented by spots "2f", "2m" and "2n". Those of light emitted from the iRED 3 become as represented by spots "3f", "3m" and "3n".

The light receiving spots which vary according to the distances to the object are arranged across the boundary line between the light receiving areas 4a and 4b. Therefore, the areas of the light receiving spots on the light receiving areas 4a and 4b vary accordingly as the light receiving spots shift their positions. Since the position of each light receiving spot corresponds to the distance to the object, an area ratio between the area of the light receiving spot of the light receiving area 4a and that of the light receiving area 4b also corresponds to the object's distance. The area ratio between the spots of light received by the light receiving areas 4a and 4b can be obtained from photogalvanic currents Ia and Ib generated by the light receiving areas 4a and 4b in a known manner, which is, for example, as disclosed in Japanese Laid-Open Patent Application No. SHO 60-19116.

Figure 4:
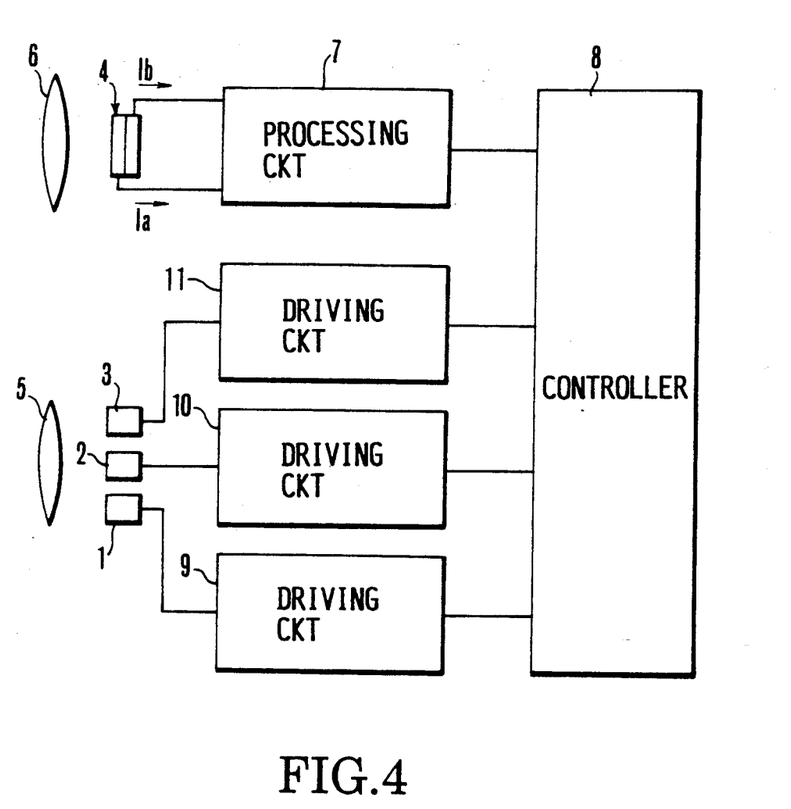
FIG. 4 is a block diagram showing the circuits of the same distance measuring device embodying the invention.

FIG. 4 shows in a block diagram the embodiment which is arranged to perform the multi-point distance measurement in the manner as described above. In FIG. 4, the same parts as those of FIGS. 1 to 3 are indicated by the same reference numerals. A processing circuit 7 is arranged to obtain distance information on the basis of the photogalvanic currents Ia and Ib generated by the light receiving areas 4a and 4b. A controller 8 is arranged to control the whole distance measuring operations of the embodiment. Driving circuits 9, 10 and 11 are arranged to drive the iREDs 1, 2 and 3 respectively.

The controller 8 sends a signal first to the driving circuit 9 to cause the iRED 1 to light up. Then, distance information is obtained from the processing circuit 7 which computes the distance information on the basis of the photogalvanic currents Ia and Ib output from the light receiving sensor 4 on which a spot light image is formed by the reflected light from the object to be photographed. Next, a signal is sent to the driving circuit 10 to cause the iRED 2 to light up. As a result, distance information is likewise obtained. After that, the iRED 3 is caused to light up to obtain distance information also in the above-stated manner.

In accordance with the arrangement of the embodiment, a plurality of light emitting elements are aligned at a given slanting angle to the base line. The boundary line between the pair of the split light receiving areas of the light receiving sensor is arranged to slant at the same angle as the row of the plurality of light emitting elements. This enables the multi-point distance measuring device to be arranged in a compact circuit size with a few number of parts including the pair of split sensors and a single processing circuit.

Further, the spots of light received from the iRED 1, 2 and 3 impinge on the split light receiving areas in the same area ratio for the same object's distance. Therefore, this does not necessitate the processing circuit to perform any correcting process for each of the iREDs. Further, in accordance with the arrangement described, the spots of projected light of the iREDs do not have to be in a circular shape. They may be in an elliptic shape or in a rectangular shape.

Figure 6A:
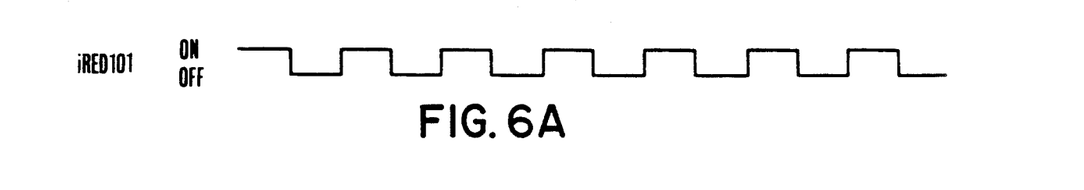
FIGS. 6A-6B show the lighting-up timing of the circuit of FIG. 5.
Figure 6B:
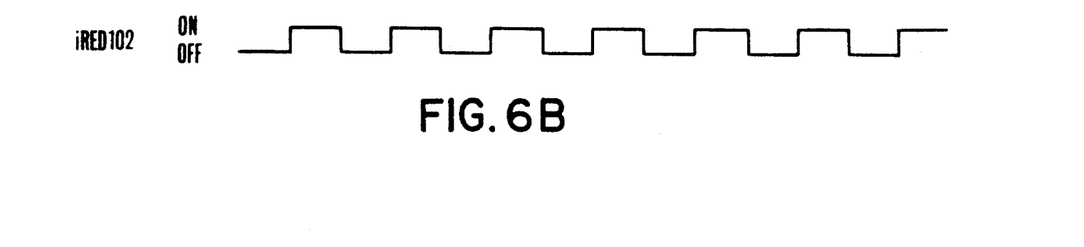

The light projecting means of the multi-point distance measuring device is arranged as described below:

In a case where two iREDs are employed as the light projecting means, the device is arranged as follows:

FIGS. 6A-6B show iRED driving timing. When a first iRED 101 is alight (i.e., when it is on), a second iRED 102 is extinct (off). When the first iRED 101 is off, the second iRED 102 is on. With the iREDs arranged in this manner, a current supplied from a battery becomes constant and unvarying even with the battery used commonly for the two iREDs. This ensures that the terminal voltage of the battery, i.e., the power supply voltage, never changes.

Figure 5:
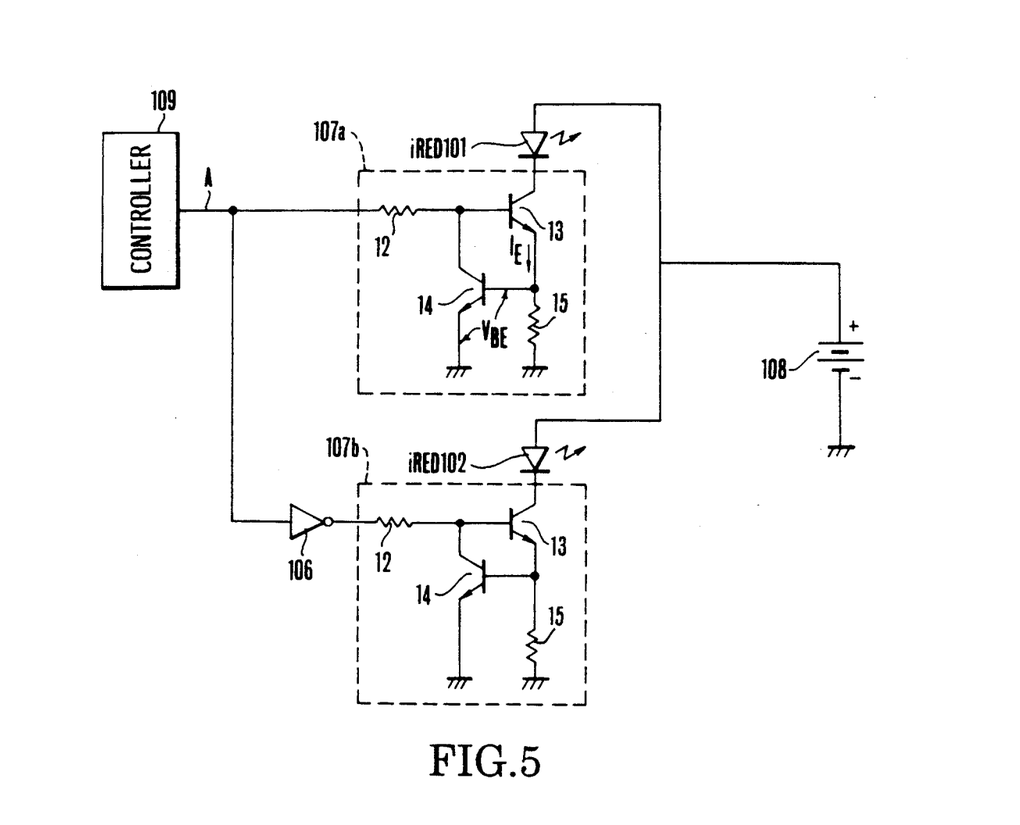
FIG. 5 is a circuit diagram showing the circuit arrangement of the light projecting part of the same distance measuring device.

FIG. 5 is a circuit diagram showing a circuit arrangement for attaining the advantageous effect of FIGS. 6A-6B. In FIG. 5, a part 107a encompassed with a broken line represents a driving circuit for driving the iRED 101. A part 107b also encompassed with a broken line represents another driving circuit for driving the iRED 102. A controller 109 produces a control signal A of a modulated phase for controlling driving actions on the first and second iREDs 101 and 102. The control signal A is supplied directly to the driving circuit 107a and via an inverter 106 to the driving circuit 107b. The cathodes of the first and second iREDs 101 and 102 are connected respectively to the driving circuits 107a and 107b. Their anodes are connected to the plus terminal of a common battery 108. Each of the driving circuits 107a and 107b consists of resistors 12 and 15 and transistors 13 and 14. The above-stated signal A is supplied via the resistor 12 to the base of the transistor 13 and to the collector of the transistor 14. The emitter of the transistor 13 is connected to the ground via the base of the transistor 14 and the resistor 15. The emitter of the transistor 14 is connected to the ground. The collector of the transistor 13 is connected to the cathode of the first iRED 101 or that of the second iRED 102.

The embodiment operates as follows:

Upon detection of that a distance measuring operation is performed, the controller 109 produces the phase modulated control signal A. The driving circuit 107a which is arranged to drive the first iRED 101 receives the control signal A while the driving circuit 107b which is arranged to drive the second iRED 102 receives the control signal A after the phase of the signal is inverted by the inverter 106. In other words, when either the signal A or the phase inverted signal A is at a high level, the other is at a low level. Upon receipt of the signal A at a high level, the transistor 13 of the driving circuit 107a or 107b turns on to allow a collector current to flow. As a result, a current flows to the first iRED 101 or the second iRED 102 to light up the iRED. Since the driving circuits 107a and 107b receive the control signal at opposite phases, the first and second iREDs 101 and 102 never simultaneously light up but alternately light up as shown in FIG. 6.

With the transistor 13 turned on, the flow of the collector current which is an iRED driving current causes a voltage drop at the resistor 15 which is connected to the emitter of the transistor 13. In the case of this embodiment, the transistor 14 turns on when a voltage obtained at the resistor 15 comes to exceed the base-emitter voltage VBE of the transistor 14. With the transistor 14 thus turned on, negative feedback takes place in such a way as to lessen the base current of the transistor 13. Therefore, with the resistance value of the resistor 15 assumed to be R15, the emitter current IE of the transistor 13 can be expressed as follows:

$$IE = VBE/R15$$

The emitter current IE is thus arranged to be a constant current irrespective of the voltage of the battery 108.

If the current amplifying rate "hfe" of the transistor 14 is sufficiently large, the iRED driving current IiRED is approximately equal to the emitter current IE. Therefore, the iRED is driven with a constant current irrespective of the battery voltage.

Figure 7:
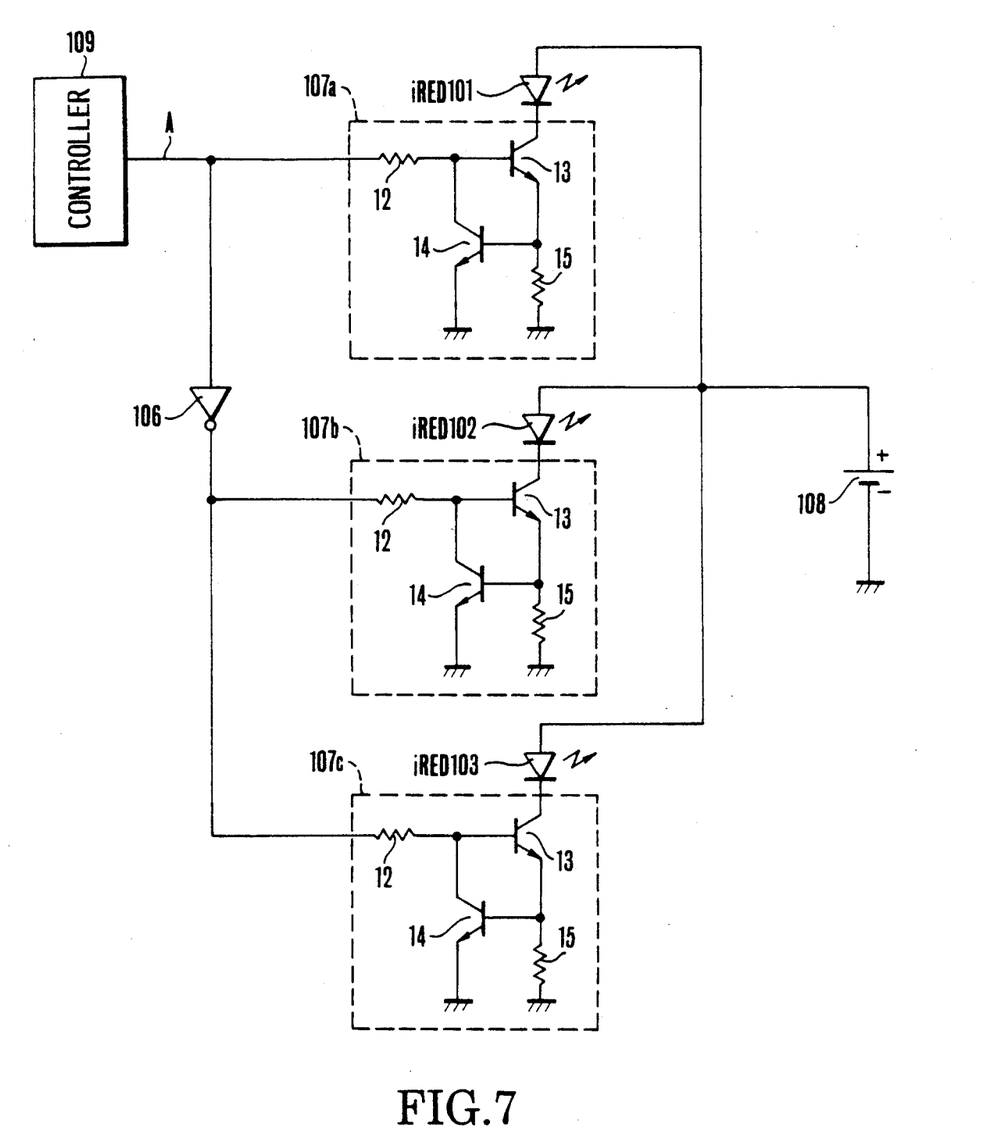
FIG. 7 is a circuit diagram showing the circuit arrangement of the light projecting part of another embodiment of this invention.
Figure 8A:
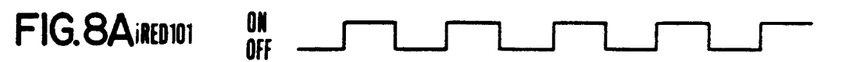
FIGS. 8A-8C show the lightingup timing of the circuit of FIG. 7.
Figure 8B:
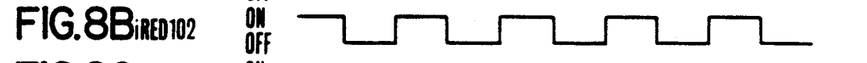
Figure 8C:
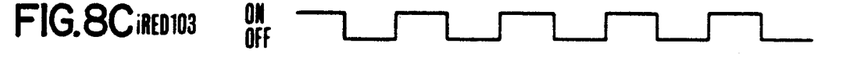

FIGS. 7 and 8A-8C show another embodiment of the invention, which uses three iREDs as light projecting means. In this case, the iRED driving timing is in relation to the iRED driving current as shown in FIGS. 8A-8C. Referring to FIGS. 8A-8C, second and third iREDS 102 and 103 are off, or extinct, when the first iRED 101 is on, or alight. The second and third iREDs 102 and 103 are on when the first iRED 101 is off. Therefore, the current variations take place only to a degree corresponding to one iRED despite of the arrangement for driving three iREDs. This lessens the power supply voltage variations.

FIG. 7 is a circuit diagram showing a circuit arrangement required for attaining the advantageous effect of FIGS. 8A-8C. In FIG. 7, the same parts as those of FIG. 5 are indicated by the same reference numerals and symbols. A reference numeral 107c denotes a driving circuit for driving the third iRED 103. The driving circuit 107c is arranged in the same manner as the driving circuits 107a and 107b.

FIGS. 9 and 10A-10D show a further embodiment of the invention. The embodiment uses four iREDs as the light projecting means. Referring to FIGS. 10A-10D, first and second iREDs 101 and 102 are arranged to light up at the same timing. Third and fourth iREDs 103 and 104 are arranged to light up when the first and second iREDs 101 and 102 are extinct. Therefore, the current supplied from the battery is always constant. The power supply voltage never changes. However, since two iREDs are allowed to simultaneously light up, the embodiment of course necessitates the use of a battery capable of simultaneously lighting up two iREDs.

Figure 9:
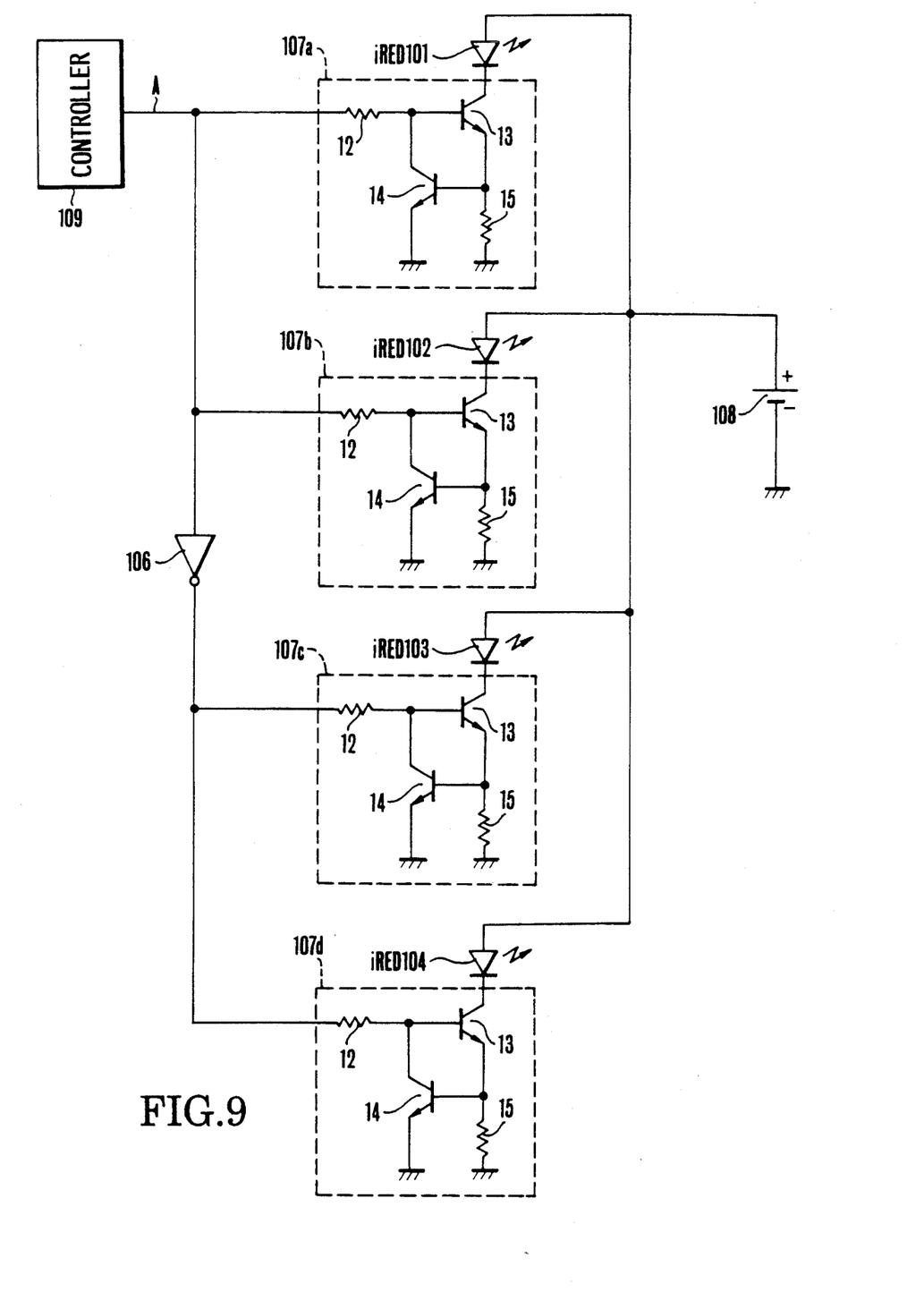
FIG. 9 is a diagram showing the circuit arrangement of the light projecting part of a further embodiment of the invention.
Figure 10A:
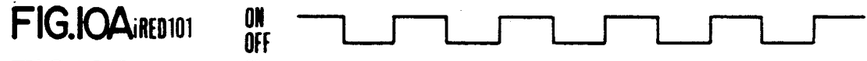
FIGS. 10A-10D show the lighting-up timing of the circuit of FIG. 9.
Figures 10B, 10C:
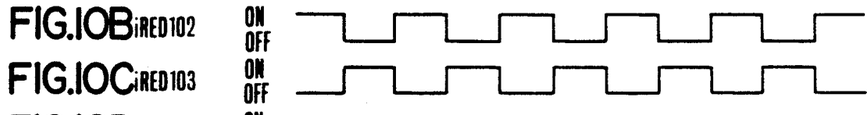
Figure 10D:
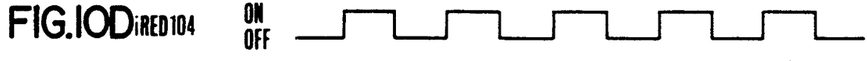

FIG. 9 is a circuit diagram showing a circuit arrangement required for attaining the advantageous effect of FIGS. 10A-10D. In FIG. 9, the same parts as those of FIG. 5 are indicated by the same reference numerals and symbols. A reference numeral 107d denotes a driving circuit which is arranged to drive the fourth iRED 104. The driving circuit 107d is arranged in the same manner as the driving circuits 107a, 107b and 107c.

The invented arrangement of the light projecting means described is applicable not only to the distance measuring device of FIG. 1 but is applicable also to distance measuring devices arranged in different manners. This invention is applicable, for example, to a distance measuring device wherein: Semiconductor position detectors (PSDs) are employed as light receiving elements; a plurality of the PSDs are arranged in positions corresponding to a plurality of light projecting means; and each PSD is provided with a light receiving circuit for obtaining the measured distance information. The invention is applicable to a wide range of distance measuring devices of different kinds as long as a plurality of light emitting means can be arranged.

In the multi-point distance measuring device of a camera of the kind performing distance measurement not only for the central part but also for the peripheral parts of a picture plane, the plurality of light projecting means are arranged according to this invention, as described in the foregoing, to differentiate the distance measuring lightning-up timing of one light projecting means from that of another. This arrangement enables the embodiment to lessen the distance measurement error by reducing the variations of the terminal voltage of the battery disposed within the camera, i.e., the power supply voltage, without necessitating the capacity of the battery to be increased. Further, compared with the conventional method of time serially obtaining measured distance information for different distance measuring points, for example, by allowing iREDS to light up for a given period of time one after another in rotation, the period of time required for distance measurement can be shortened by the invented arrangement.

Figure 11:
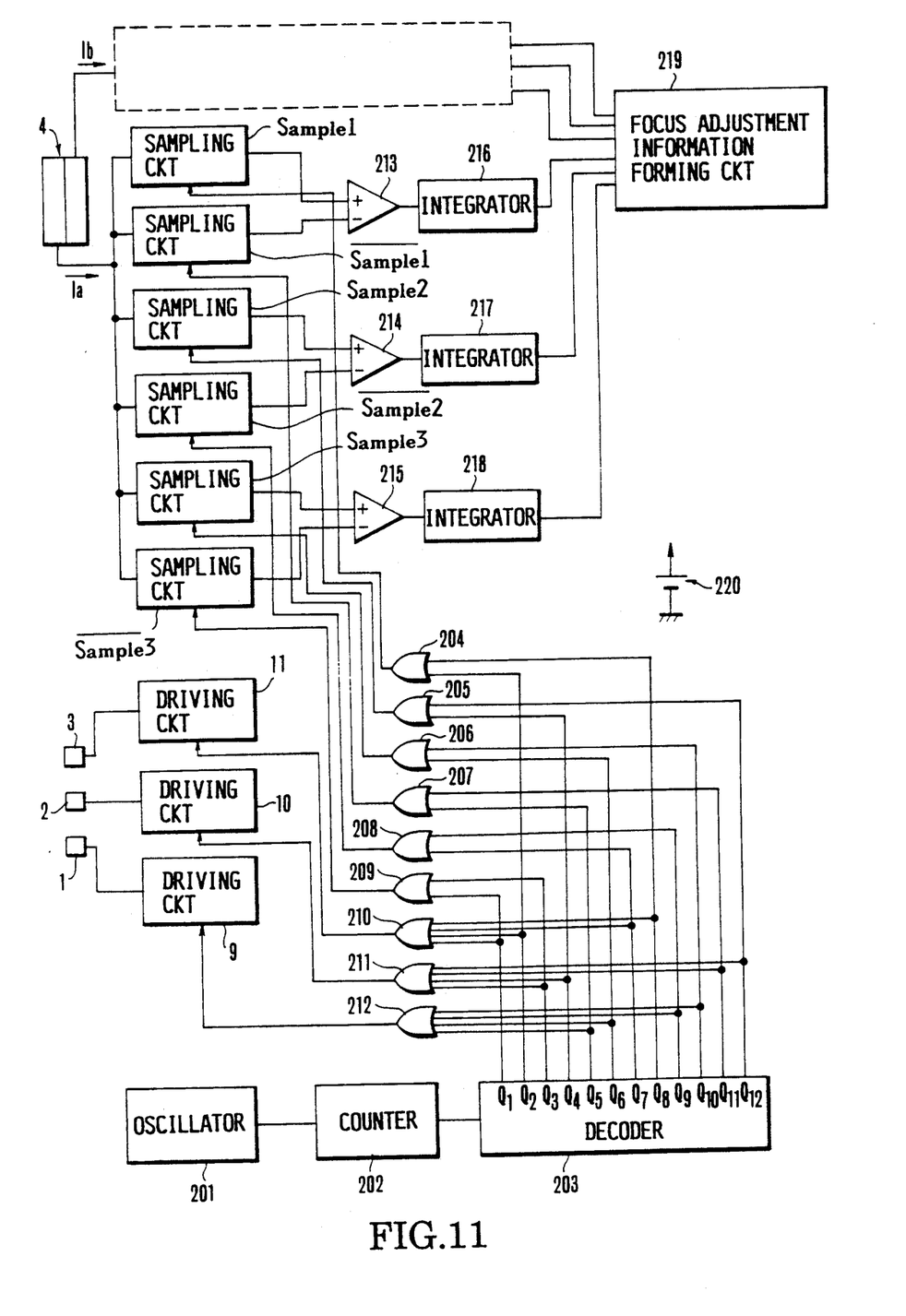
FIG. 11 is a circuit diagram of a distance measuring device showing a still further embodiment of the invention.
Figure 12A:
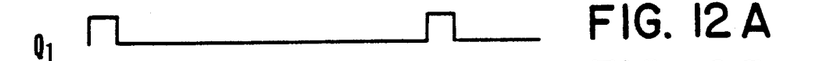
FIGS. 12A-12U show the timing of the circuit shown in FIG. 11.
Figure 12B:
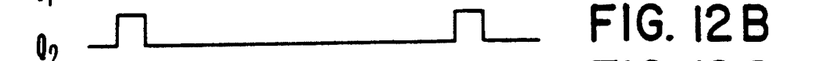
Figure 12C:
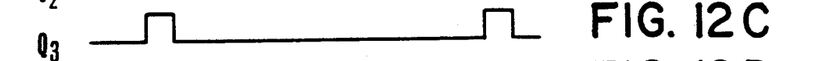
Figure 12D:
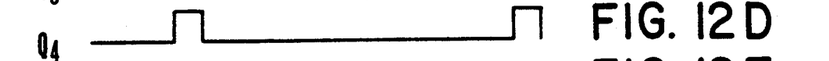
Figure 12E:
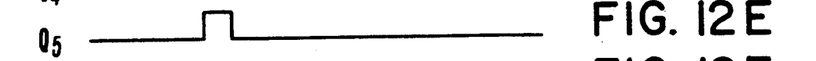
Figure 12F:
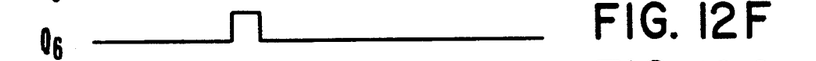
Figure 12G:
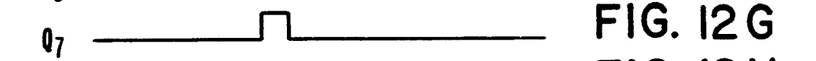
Figure 12H:
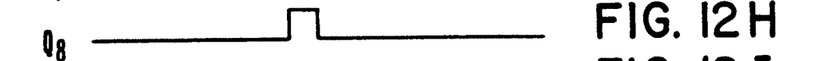
Figure 12I:
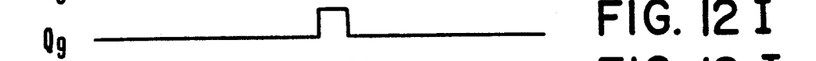
Figure 12J:
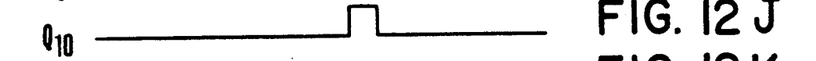
Figure 12K:
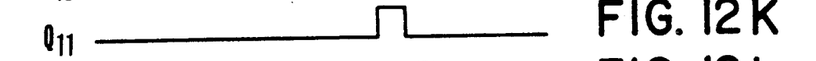
Figure 12L:
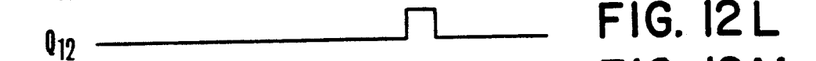

FIG. 11 shows a further embodiment of the invention. In FIG. 11, the same component parts as those of the preceding embodiments are indicated by the same reference numerals and the details of them are omitted from the following description. Referring to FIG. 11, a reference numeral 201 denotes an oscillator. A counter 202 is arranged to count the output of the oscillator 201. A decoder 203 is arranged to decode the output of the counter 202 into cyclic outputs Q1 to Q12, which are as shown in FIGS. 12A-12U. OR gates 204 to 212 are arranged to receive the outputs Q1 to Q12 of the decoder 203 in a manner as shown in FIG. 11. Reference symbols $\overline{Sample1}$ to $\overline{Sample3}$ denote known sampling circuits which are arranged to sample the photo-electromotive current Ia of the light receiving sensor 4 in synchronism with the lighting-up timing of the iREDs 1 to 3. Symbols Sample1 to Sample3 denote known sampling circuits which are arranged to sample the photo-electromotive current Ia of the light receiving sensor 4 in synchronism with the non-lighting-up timing of the iREDs 1 to 3 respectively Subtracters 213 to 215 are arranged to subtract the outputs of the sampling circuits $\overline{Sample1}$ to $\overline{Sample3}$ from the outputs of the sampling circuits Sample1 to Sample3 and to take out only such signal components that are obtained after removal of an ambient light component from reflection light corresponding to each of the iREDs 1 to 3. Integrators 216 to 218 are arranged to amplify the signal components by integrating the outputs of the subtracters 213 to 215. A known focus adjustment information forming circuit 219 is arranged to receive the outputs of the integrators 216 to 218 and to form focus adjustment information by obtaining distance information obtained for each distance measuring field within the picture plane on which the signal light of each of the iREDs 1 to 3 is received. A common power source battery 220 is arranged to drive the above-stated circuits.

Another photo-electromotive current Ib of the light receiving sensor 4 is also processed by the same arrangement before it is supplied to the focus adjustment information forming circuit 219. Since the circuit arrangement for the current Ib is identical with the circuit arrangement described above for the current Ia, the arrangement for the current Ib is simply indicated by a block in FIG. 11 and is omitted from description. While the following description is limited to the arrangement for the photo-electromotive current Ia, the other current Ib is processed in exactly the same manner.

The operation of the arrangement of FIG. 11 is described below with reference to FIGS. 12A-12U which are timing charts:

The output of the oscillator 201 is counted by the counter 202. The counted value of the counter 202 is decoded by the decoder 203 into the signals Q1 to Q12 which are as shown in FIGS. 12A-12L. The decoded signals Q1 to Q12 are supplied to the OR gates 204 to 212. The driving circuits 9, 10 and 11, the sampling circuits $\overline{Sample1}$ to $\overline{Sample3}$ and the sampling circuits Sample1 to Sample3 are respectively driven by the high level outputs of these OR gates 204 to 212. By this, the iREDs 1 to 3 and the sampling circuits are driven at the timing as shown in FIGS. 12M-12U. In other words, the photo-electromotive currents output from the light receiving sensor 4 when the iREDs 1 to 3 light up and when they are extinct are sampled by the sampling circuits Sample1 to Sample3 and $\overline{Sample1}$ to $\overline{Sample3}$ respectively.

Sampled signals which are thus obtained are supplied to the subtracters 213 to 216. The sampled signals obtained when the iREDs 1 to 3 are extinct are subtracted from the corresponding sampled signals obtained when the iREDs 1 to 3 are alight. The ambient light component corresponding to each of the iREDs 1 to 3 is thus removed to obtain a reflection signal component. The signal components obtained for the iREDs 1 to 3 in this manner are supplied respectively to the integrators 216 to 218 to be amplified there. The amplified signal components are supplied to the focus adjustment information forming circuit 219.

At the focus adjustment information forming circuit 219, distance information is obtained for the distance measuring fields which receive the light of the iREDs 1 to 3 within the picture plane. The circuit 219 then forms focus adjustment information, on the basis of the distance information, for the photo-taking optical system, etc..

Figure 12M:
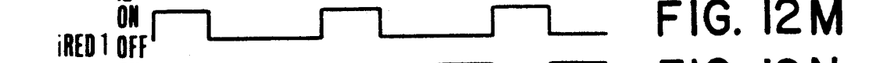
Figure 12N:
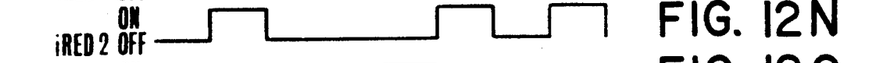
Figure 12O:
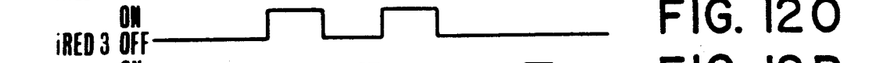
Figure 12P:
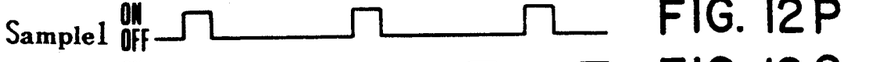
Figure 12Q:
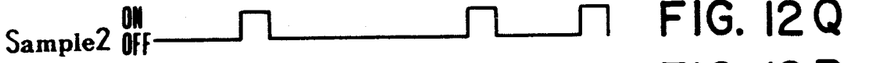
Figures 12R, 12S:
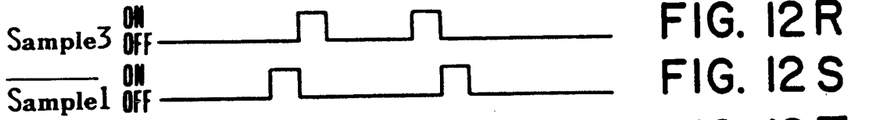
Figures 12T, 12U:
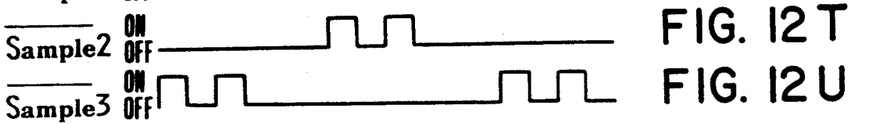

In the case of this embodiment, as shown in FIGS. 12M-12O, sampling timing for the extinct state of each of the iREDs 1 to 3, say, the iRED 1 is arranged to be synchronous with the lighting-up timing of one of other iREDs 2 and 3 which lights up later than the lighting-up timing of the iRED 1. The timing is arranged in this manner for the purpose of preventing the sample obtained under a non-lighted condition from being affected by any afterimage of a lighted-up state.

Further, as shown in FIGS. 12P-12U, the sampling timing for the non-lighted or extinct state of each of the iREDs 1 to 3, or that of the iRED 1 for example, is arranged to be synchronous alternately with the lighting-up timing of one of other iREDs 2 and 3. This is for the purpose of neutralizing the adverse effects of the lighted-up states of the iREDs 2 and 3 on the sample obtained when the iRED 1 is extinct.

I claim:
1. A distance measuring device for measuring a distance to an object by projecting a signal light onto the object and then by receiving a reflected light from the object, or a camera having said distance measuring device, comprising:
 a) light projecting means for projecting said signal light, said light projecting means including first, second and third light emitting parts; arranged to emit said signal light;
 b) a common drive source for driving said first, second and third light emitting parts; and
 c) control means for preventing said first and second light emitting parts from simultaneously lighting up and for causing said third light emitting part to light up simultaneously with said first or second light emitting part.
2. A device or a camera according to claim 1, wherein said common drive source includes a battery.

3. A device or a camera according to claim 1, further comprising light receiving means for receiving a reflected light of said signal light projected from said first and second light emitting parts, said light receiving means being arranged to obtain information on distances measured for different points of a picture plane corresponding to said first and second light emitting parts.

4. A device or a camera according to claim 3, wherein said light receiving means includes first and second light receiving faces, a boundary line between said first and second light receiving faces slanting at a predetermined angle to a base line.

5. A device or a camera according to claim 4, wherein said first and second light projecting parts are aligned in a row which slants at said predetermined angle to said base line.

6. A device or a camera according to claim 1, further comprising light receiving means for receiving a reflected light of said signal light projected from said first, second and third light emitting parts, said light receiving means being arranged to obtain information on distances measured for different points of a picture plane corresponding to said first, second and third light emitting parts.

7. A device or a camera according to claim 6, wherein said light receiving means includes sampling means for sampling the reflected light received when each of said first, second and third light emitting parts does not light up, the timing of sampling performed by said sampling means when one of said first, second and third light emitting parts does not light up being alternately synchronized with the timing of lighting-up performed by the other two of said first, second and third light emitting parts.

8. A device or a camera according to claim 6, wherein said light receiving means includes sampling means for sampling the reflected light received when each of said first, second and third light emitting parts does not light up, the timing of sampling performed by said sampling means when one of said first, second and third light emitting parts does not light up being synchronized with the timing of lighting-up performed by one of the other two of said first, second and third light emitting parts which lights up later relative to the timing of lighting-up performed by said one of said first, second and third light emitting parts.

9. A distance measuring device for measuring a distance to an object by projecting a signal light onto the object and then by receiving a reflected light from the object, or a camera having said distance measuring device, comprising:
a) light projecting means for projecting said signal light, said light projecting means including first, second and third light emitting parts arranged to emit said signal light, said first, second and third light emitting parts not lighting up simultaneously with one another; and
b) light receiving means for receiving a reflected light of said signal light, said light receiving means including sampling means for sampling the reflected light received when each of said first, second and third light emitting parts does not light up, the timing of sampling performed by said sampling means when one of said first, second and third light emitting parts does not light up being alternately synchronized with the timing of lighting-up performed by the other two of said first, second and third light emitting parts.

10. A distance measuring device for measuring a distance to an object by projecting a signal light onto the object and then by receiving a reflected light from the object, or a camera having said distance measuring device, comprising:
a) light projecting means for projecting said signal light, said light projecting means including first, second and third light emitting parts arranged to emit said signal light, said first, second and third light emitting parts not lighting up simultaneously with one another; and
b) light receiving means for receiving a reflected light of said signal light, said light receiving means including sampling means for sampling the reflected light received when each of said first, second and third light emitting parts does not light up, the timing of sampling performed by said sampling means when one of said first, second and third light emitting parts does not light up being synchronized with the timing of light-up performed by one of the other two of said first, second and third light emitting parts which lights up later relative to the timing of lighting-up performed by said one of said first, second and third light emitting parts.

11. A distance measuring device for measuring a distance to an object by projecting a signal onto the object and then by receiving a reflected signal from the object, or a camera having said distance measuring device, comprising:
a) signal means for projecting said signal, said signal projecting means including first, second and third signal sending parts; arranged to emit said signal;
b) a common drive source for driving said first, second and third light signal sending parts; and
c) control means for preventing said first and second signal sending parts from simultaneously lighting up and for causing said third signal sending part to send said signal simultaneously with said first or second signal sending part.

12. A device or a camera according to claim 11, wherein said common drive source includes a battery.

13. A device or a camera according to claim 11, further comprising signal receiving means for receiving a reflected signal of said signal projected from said first and second signal sending parts, said signal receiving means being arranged to obtain information on distances measured for different points of a picture plane corresponding to said first and second signal sending parts.

14. A device or a camera according to claim 13, wherein said signal receiving means includes first and second signal receiving faces, a boundary line between said first and second signal receiving faces slanting at a predetermined angle to a base line.

15. A device or a camera according to claim 14, wherein said first and second signal sending parts are aligned in a row which slants at said predetermined angle to said base line.

16. A device or a camera according to claim 11, further comprising signal receiving means for receiving a reflected signal of said signal projected from said first, second and third signal sending parts, said signal receiving means being arranged to obtain information on distances measured for different points of a picture plane corresponding to said first, second and third signal sending parts.

17. A device or a camera according to claim 16, wherein said signal receiving means includes sampling means for sampling the reflected signal received when each of said first, second and third signal sending parts does not send said signal, the timing of sampling performed by said sampling means when one of said first, second and third signal sending parts does not send said signal being alternately synchronized with the timing of sending of said signal performed by the other two of said first, second and third signal sending parts.

18. A device or a camera according to claim 16, wherein said signal receiving means includes sampling means for sampling the reflected signal received when each of said first, second and third signal sending parts does not send said signal, the timing of sampling performed by said sampling means when one of said first, second and third signal sending parts does not send said signal being synchronized with the timing of sending of said signal performed by one of the other two of said first, second and third signal sending parts which sends said signal later relative to the timing of sending of said signal performed by said one of said first, second and third signal sending parts.

19. A distance measuring device for measuring a distance to an object by projecting a signal onto the object and then by receiving a reflected signal from the object, or a camera having said distance measuring device, comprising:
 a) signal projecting means for projecting said signal, said signal projecting means including first, second and third signal sending parts arranged to send said signal, said first, second and third signal sending parts not sending said signal simultaneously with one another; and
 b) signal receiving means for receiving a reflected signal of said signal, said signal receiving means including sampling means for sampling the reflected signal received when each of said first, second and third signal sending parts does not send said signal, the timing of sampling performed by said sampling means when one of said first, second and third signal sending parts does not send said signal being alternately synchronized with the timing of sending of said signal performed by the other two of said first, second and third signal sending parts.

20. A distance measuring device for measuring a distance to an object by projecting a signal onto the object and then by receiving a reflected signal from the object, or a camera having said distance measuring device, comprising:
 a) signal projecting means for projecting said signal, said signal projecting means including first, second and third signal sending parts arranged to send said signal, said first, second and third signal sending parts not sending said signal simultaneously with one another and
 b) signal receiving means for receiving a reflected signal of said signal, said signal receiving means including sampling means for sampling the reflected signal received when each of said first, second and third signal sending parts does not send said signal, the timing of sampling performed by said sampling means when one of said first, second, and third signal sending parts does not send said signal being synchronized with the timing of sending of said signal performed by one of the other two of said first, second and third signal sending parts which sends said signal later relative to the timing of sending of said signal performed by said one of said first, second and third signal sending parts.

* * * * *

UNITED STATES PATENT AND TRADEMARK OFFICE
CERTIFICATE OF CORRECTION

PATENT NO. : 5,060,004
DATED : October 22, 1991
INVENTOR(S) : Kiyoshi Ikuta It is certified that error appears in the above-identified patent and that said Letters Patent is hereby corrected as shown below:

Col. 3, line 15.  Change "lightingup" to -- lighting-up --
Col. 5, line 36.  Delete "of"
Col. 6, line 17.  Delete "of"
Col. 7, lines 27, 38.  Change "$\frac{-------}{\text{Sample 1}}$ to $\frac{-------}{\text{Sample 3}}$" to
    -- Sample 1 to Sample 3 --
Col. 8, lines 5, 12.  Change "$\frac{-------}{\text{Sample 1}}$ to $\frac{-------}{\text{Sample 3}}$" to
    -- Sample 1 to Sample 3 --

Signed and Sealed this

Twenty-third Day of February, 1993

*Attest:*

STEPHEN G. KUNIN

*Attesting Officer*     *Acting Commissioner of Patents and Trademarks*